Jan. 2, 1951 J. R. STEWART 2,536,825

MULTIPLEX TELEPHONY

Filed March 26, 1948 6 Sheets-Sheet 1

INVENTOR.
JAMES R. STEWART
BY T. L. Bowes
ATTORNEY

INVENTOR.
JAMES R. STEWART
BY *T. L. Bowes*
ATTORNEY

Jan. 2, 1951

J. R. STEWART

MULTIPLEX TELEPHONY 2,536,825

Filed March 26, 1948

6 Sheets-Sheet 3

INVENTOR.
JAMES R. STEWART
BY T. L. Bowes
ATTORNEY

INVENTOR.
JAMES R. STEWART
BY T. L. Bowes
ATTORNEY

Jan. 2, 1951 J. R. STEWART 2,536,825

MULTIPLEX TELEPHONY

Filed March 26, 1948 6 Sheets-Sheet 5

INVENTOR.
JAMES R. STEWART
BY T. L. Bowes
ATTORNEY

Jan. 2, 1951

J. R. STEWART

MULTIPLEX TELEPHONY 2,536,825

Filed March 26, 1948

6 Sheets-Sheet 6

INVENTOR.
JAMES R. STEWART
BY *T. L. Bowes*
ATTORNEY

Patented Jan. 2, 1951 2,536,825

UNITED STATES PATENT OFFICE 2,536,825

MULTIPLEX TELEPHONY

James R. Stewart, Rochester, N. Y., assignor to Stromberg-Carlson Company, a corporation of New York Application March 26, 1948, Serial No. 17,260

6 Claims. (Cl. 250—6)

Figure 1:
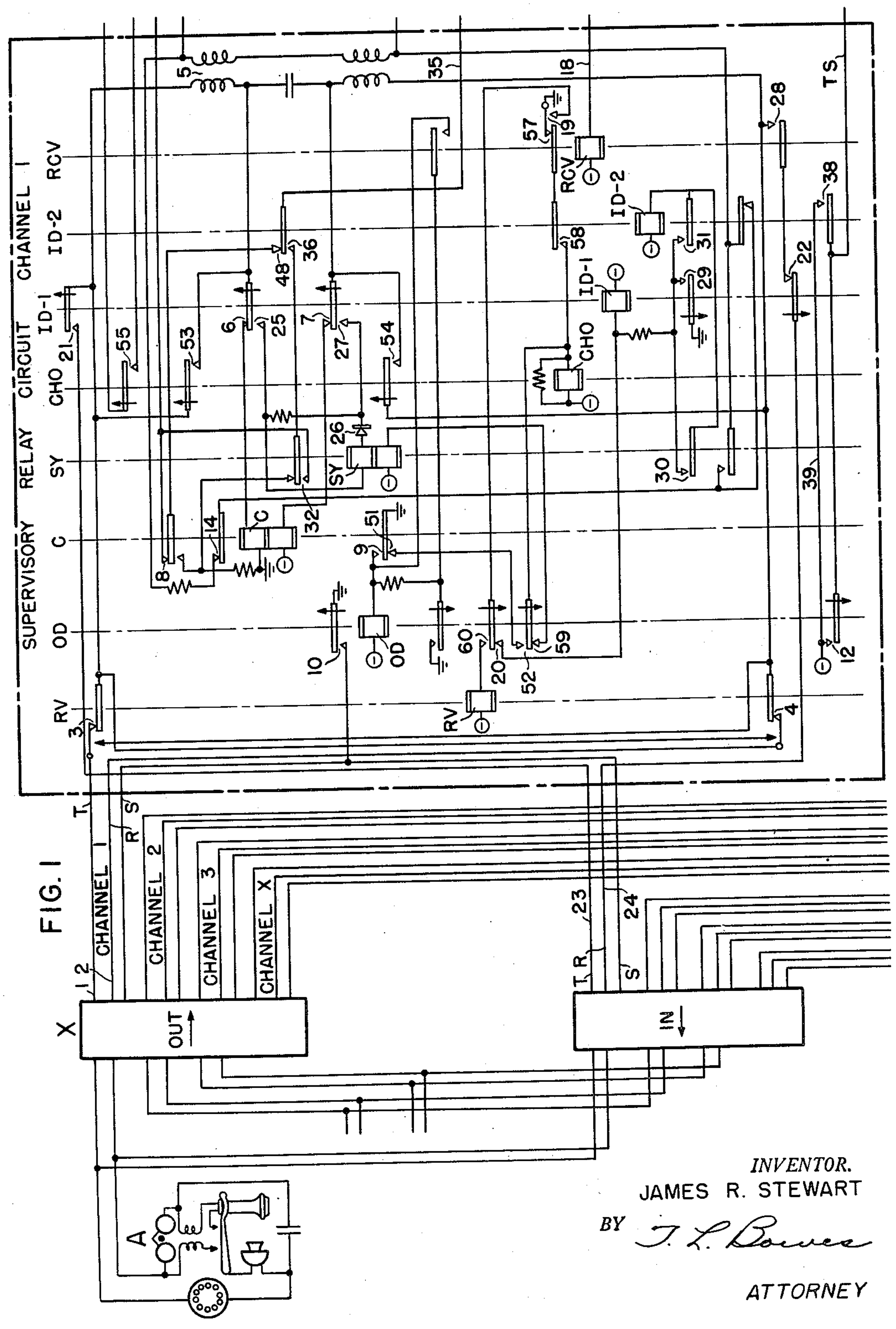

This invention relates to telephone systems and more particularly to multiplex systems employing a plurality of non-interfering carrier frequency currents transmitted over a common line or conducting medium, either wires, through space, or by a combination of the two, and specifically to so called automatic switching systems in which automatic switches are employed for establishing connections with called lines which switches are controlled from the calling terminal over the common line and in which so called supervisory signalling between the calling and called terminals is also effected over the common conducting medium.

In general the carrier frequency currents employed are chosen, as in well known practice, such that each carrier frequency does not interfere with any of the others superposed on the conducting medium over which they are transmitted, and form what are conventionally known as transmission channels.

Each of these channel frequencies is modulated in accordance with the voice or other signalling currents transmitted and at the distant terminal is selectively translated by appropriate receiving means to effect response of apparatus such as a telephone receiver, relay or other signal receiving device.

The underlying principle and a general description of multiplex carrier systems is well known and was early discussed in a paper by Colpitts and Blackwell and published in the Journal of the American Institute of Electrical Engineers for April 1921.

In general the system of the invention disclosed uses frequency modulation radio equipment, to provide a two-way link in the connecting medium between terminals, which has an audio response sufficently wide to accommodate a plurality of channels in a frequency multiplex plan which in the present design allows approximately 4,000 cycles for each channel, to provide for voice, supervisory, signalling, and frequency separation, one of the channels, the first for example, occupying the range of 250 to 3500 cycles, the second 4200 to 7600 cycles, 8400 to 11,800 for the third and 12,800 to 16,200 for the fourth channel, etc.

The first channel is, however, transmitted without the aid of a carrier, i. e. as a normal telephone circuit and directly modulates the radio carrier which may be of the order of 152 to 162 megacycles, for example, but the second channel is transmitted as the lower side band frequency of a modulated carrier frequency of 7600 cycles which is superposed on and modulates the same high frequency radio carrier and the third and fourth channels are transmitted to and modulate the radio carrier as lower side bands of channel carriers of 11,800 and 16,200 cycles respectively. By proper design and frequency allotment other channels could be added without departing from the spirit of the invention.

At the other end of the line the received modulated radio frequency is converted by the heterodyne method to a frequency in the audio range, passed through separation filters, and in the case of transmission of modulated frequency components of the second and following channels is demodulated, to selectively control receiving devices responsive to the demodulated frequency.

In this arrangement the individual channel carriers are all applied in common to the radio link and transmitted simultaneously on the high frequency radio carrier, and a two-way arrangement is contemplated and disclosed comprising two complete radio links simultaneously operated in opposite direction with carriers of different frequency, which may be of the order of five megacycles apart, one for east to west transmission and the other from west to east.

Specifically the system in its fundamental aspects, provides for two or more non-interfering telephone circuits between two automatic or machine switching exchanges over a common connecting medium including a radio link in which means are provided for converting into audio frequency, outside the voice range, transmitting, and reconverting conventional signals such as switch seizure or "start dialing" signals, dial pulses, busy signals, answering supervisory signals and disconnect signals normally transmitted over conventional wire circuits. The expression "voice range" used herein means the range of frequencies normally transmitted through telephone systems for the purpose of conveying speech and other sounds, as approximately 250 cycles to approximately 3000 cycles.

An object of the invention is to provide an organization in which a plurality of non-interfering automatic telephone connections, including all dialing and supervisory functions, may be established and maintained over a common conducting medium comprising a radio link.

A feature of the invention resides in a multiplex carrier telephone system in which a plurality of non-interfering automatic telephone connections between two exchanges are established and speech transmission and supervisory signalling provided over a common conducting medium characterized in this that said common medium comprises a radio link.

A more specific feature resides in means for translating normal dialing and so called supervisory signals originating, at either telephone terminal, into a controlling audio frequency outside the voice range, superposing said controlling frequency on the carrier frequency of said link, either directly or as a modulation component of an audio frequency carrier, to cause modulation of the radio carrier and for re-translating said modulating carrier frequency at the other end of the link to normal switch control and supervisory signals for the control of automatic switch and/or suprevisory signal means.

Figure 7:
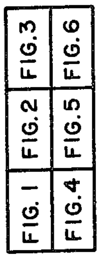

Other features of the invention will appear from the following description when read in connection with the accompanying drawings, Figures 1 to 6 of which when arranged in accordance with Figure 7 represents one end of a two way multiplex carrier telephone circuit, three channels being shown, between two automatic telephone exchanges which circuit includes an intermediate radio link, the other end of the circuit, at the distant terminal being identical in the matter of circuit apparatus and connections but arranged in a reverse direction.

Referring to Figure 1 of the drawing, a dial subscriber's station A is shown, the line of which terminates in an automatic exchange X of conventionaly type, arranged to connect the line, under control of the station dial to an outgoing carrier channel 1, 2 or 3, or to an incoming channel 1, 2 or 3, responsive to dial pulses, transmitted over the circuit from the distant terminal.

Figure 2:
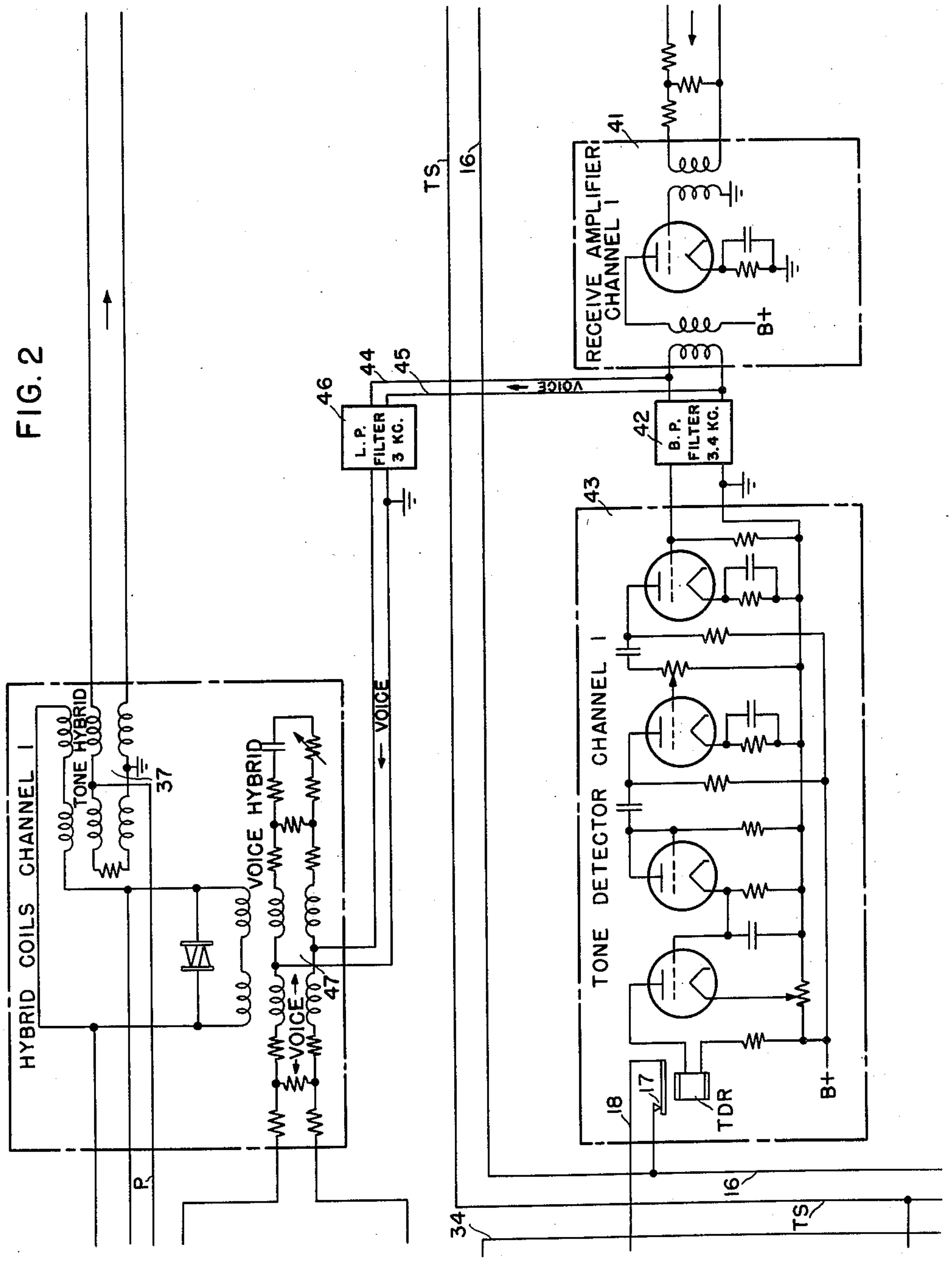
Figure 3:
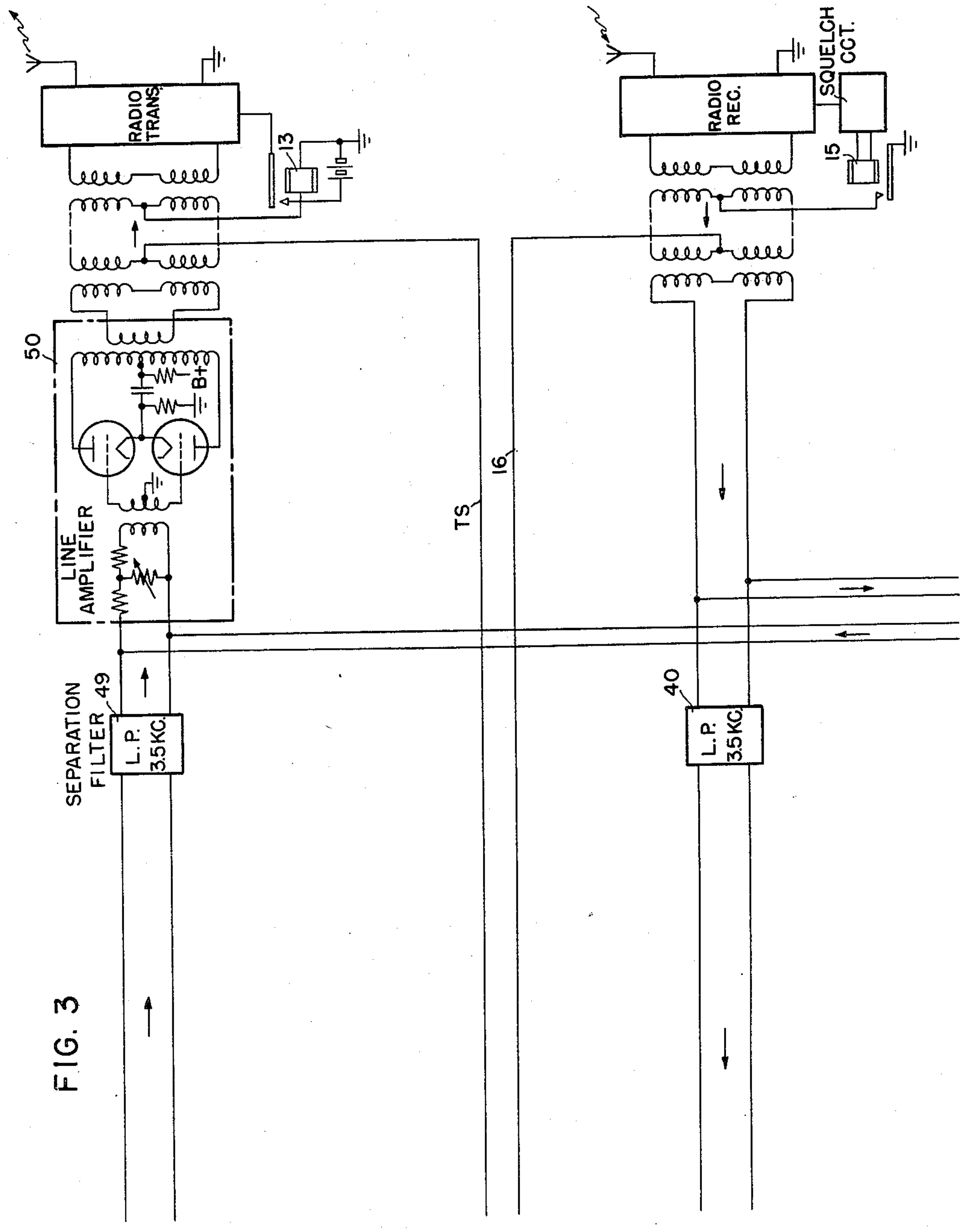

Figures 1, 2 and 3 also disclose, schematically, circuits for the first channel, Figure 1 showing the circuit arrangement for translating direct current supervisory signals to audio frequency currents outside the voice range, for outgoing transmission and for reeciving and translating audio frequency signals transmitted from the distant terminal for controlling direct current supervisory instrumentalities at the near terminal.

Figure 4:
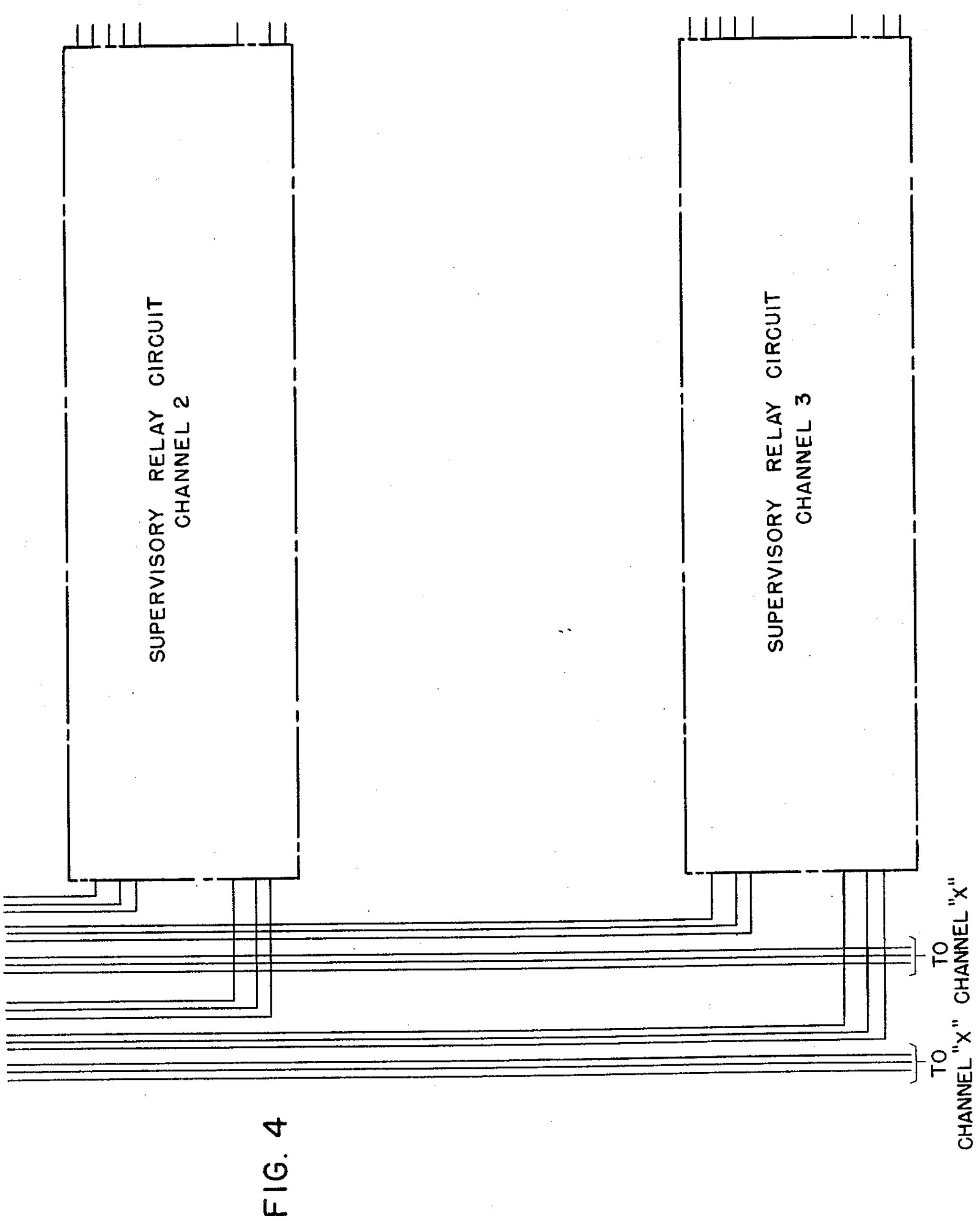
Figure 5:
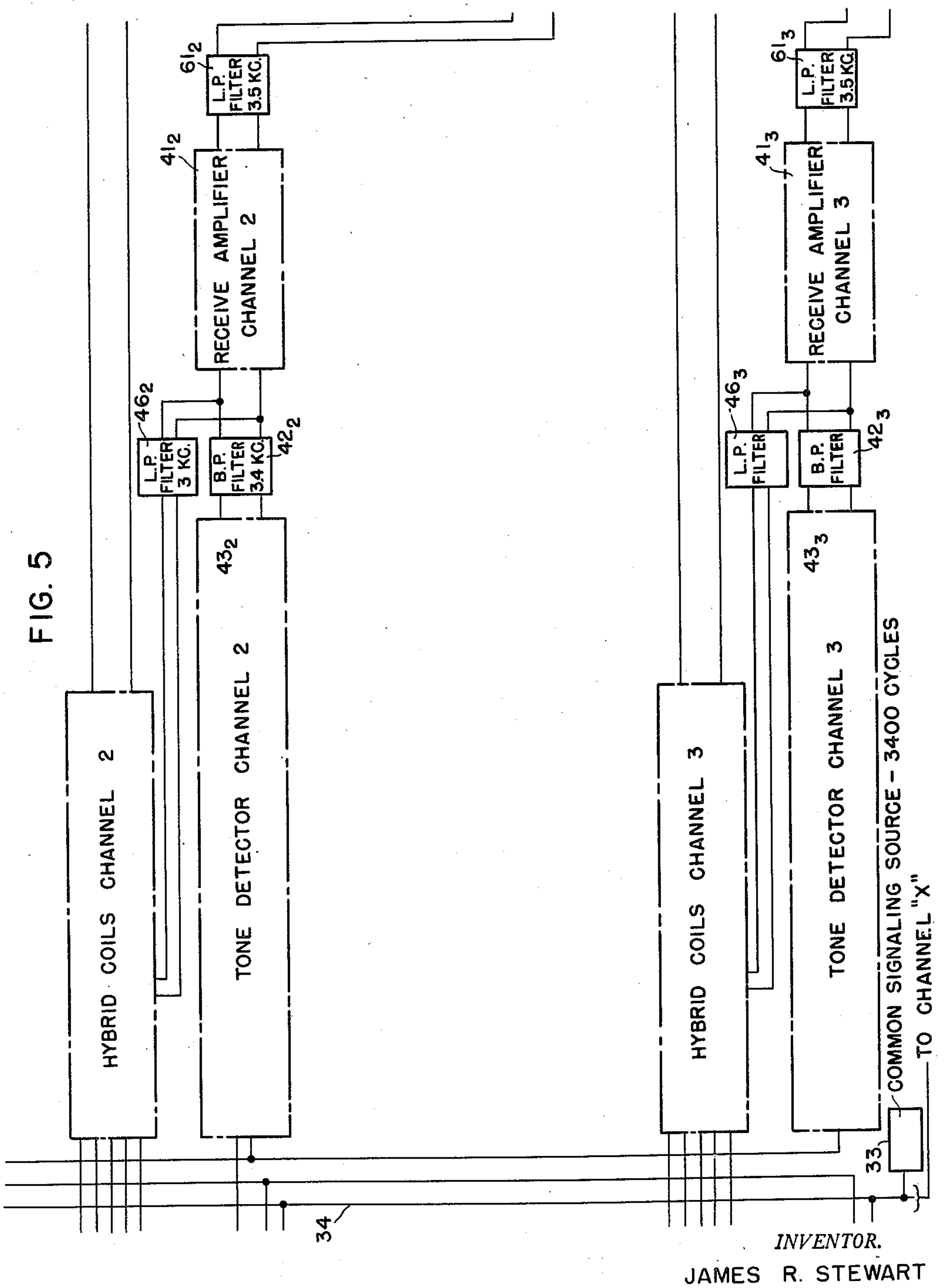
Figure 6:
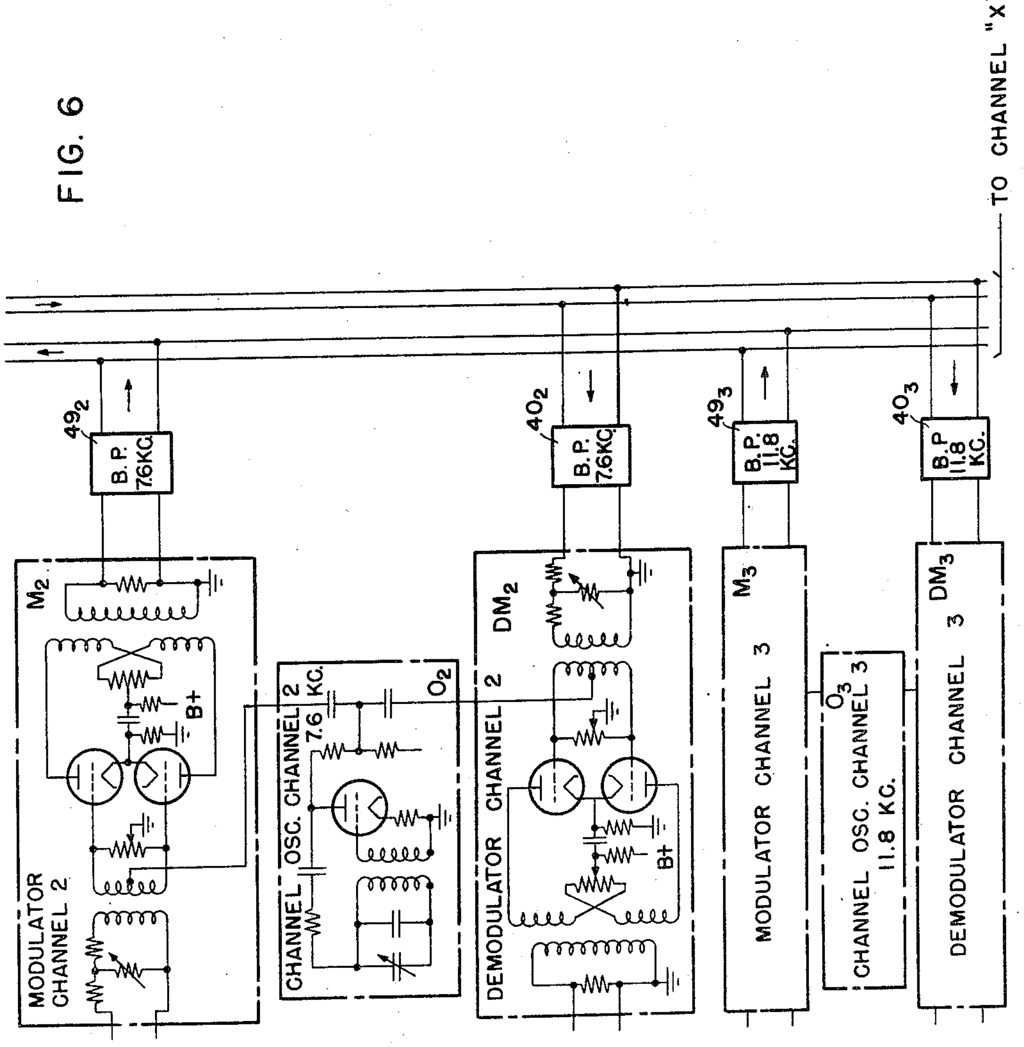

Figure 2 shows a hybrid coil for directing outgoing speech frequencies to the high frequency transmitter of the radio link and for directing incoming speech frequency components of the wave receiving by the respective radio receiver to the channel in use. This figure also shows necessary filters, an amplifier for the received modulation components of the radio wave, and a detector for translating the received and amplified signal component of the radio wave for controlling supervisory functions at the automatic exchange, and Figure 3 shows a low pass separation filter in both the outgoing and incoming branches of channel 1 to pass the frequencies alloted to the channel, i. e., audible speech frequencies and the audio signal frequency outside the speech range, but to bar all higher frequencies allotted to the other channels, it being understood as previously mentioned that the first channel transmits to and receives from the radio link at normal speech and signal frequencies, i. e., 250 to 3,400, without the aid of intermediate channel carriers as employed in the second and following channels. In this figure a line amplifier is also shown connected ahead of the radio transmitter for the obvious purpose of increasing the input level thereto, and Figures 4, 5 and 6 represent in block form two additional channels, 2 and 3, which comprise the same circuit components per channel as shown in Figures 1, 2 and 3, except for the added interposition, as shown by Figure 6, of a modulator, oscillator, and demodulator for each channel to provide modulation and demodulation of the assigned carrier frequency by speech and signal frequencies applied thereto.

In general the operation and functioning of the system are briefly as follows: On a call originating at a dial station having access to the line involving the radio link a seizure occurs whereby a circuit is closed to energize the respective radio transmitter, thereby causing it to transmit its high frequency carrier, which as previously mentioned may be of the order of 152 to 162 megacycles, to the distant radio receiver which causes the operation of a squelch circuit and consequent seizure of automatic switching equipment at the called terminal and also energization of a respective radio transmitter thereby causing it to transmit its carrier, which is adjusted to transmit at a different frequency from the frequency transmitted from the first or calling terminal. At the same time an audio frequency outside the voice range, for example of the order of 3,400 cycles, is connected to the transmitter at that end of the circuit and modulates the radio carrier transmitted and which is received at the distant or calling terminal for actuating the incoming switching mechanism of its associated exchange in response to the various succeeding conditions encountered at the called exchange. The conventional audible dial tone is also received giving an indication to the calling subscriber that the called switching equipment has been seized and that dialing can proceed.

During operation of the dial at the calling station the signalling frequency (3,400 cycles) transmitted to the calling radio transmitter, in the case of channel 1, and to a respective intermediate channel modulator in the case of the succeeding channels 2, 3, etc., is intermittently interrupted whereby the radio wave is modulated accordingly.

The transmitted radio wave, modulated by the signal frequency impulses, is received at the distant or called terminal which causes the seized switch thereat to advance to the called subscriber's line.

If the called line is found to be busy the 3,400 cycle signal originating at the inward terminal is interrupted at the conventional busy pulse rate of either 120 or 60 I. M. P. which is received at the outward terminal for operating the busy circuits of the automatic exchange indicating to the calling subscriber that the called subscriber's line is busy.

If the called subscriber's line is found to be idle, connection and ringing is initiated, and when the subscriber answers the 3,400 cycle signal frequency is removed from the radio carrier transmitted from the called terminal whereupon the normal or usual battery reversal occurs at the calling terminal and conversation may proceed.

As soon as the called subscriber hangs up removal of the tip and ring battery occurs at the called terminal at which time the signal frequency is reconnected, as a modulation of the radio carrier transmitted back to the calling terminal to cause the circuits at that point to indicate to the calling subscriber that the called subscriber has disconnected.

When the calling subscriber hangs up the signal frequency at that end of the circuit is reconnected to modulate the radio carrier transmitted to the called terminal thereby restoring the circuits thereat to their idle condition.

Disconnection at both terminals de-energizes the respective transmitter, assuming that no other channel in the meantime has been taken for use, whereupon the circuits at both terminals are restored to normal.

A description of the operation of the circuits of the system follows:

It will be assumed that a call is originated at subscriber's station A and through the medium of automatic switches at exchange X the subscriber's line is extended to channel 1 of the multiplex line, if idle, over tip and ring conductors 1, 2, and contacts 3, 4, of relay RV of the supervisory relay circuit associated with the channel, primary winding of repeating coil 5, and contacts 6, 7, of relay ID-1 to battery through the windings of relay C, which relay thereupon operates and opens its contacts 8 and closes its contacts 9, thereby energizing relay OD which connects ground at its contact 10 to the sleeve conductor 11 to mark the incoming selector busy and to supply holding ground to the outward selector. Relay OD also closes its contact 12 thereby connecting battery to conductor TS thereby causing operation of start relay 13 associated with the radio transmitter (Fig. 3) to energize the transmitter and cause it to send out its pre-determined high frequency carrier. This is based on the assumption that no other channel has been seized in the meantime to perform this starting function. The operation of relay C previously mentioned also opens its contact 14 for a purpose hereinafter mentioned.

The high frequency carrier sent out by the radio transmitter at the calling or outward terminal of the line is received by the antenna of the distant or inward radio receiver, which it is assumed is in condition for reception, whereupon its squelch circuit is energized and squelch relay 15 operates.

At this point it will be understood that as the circuits and apparatus are identical at both terminals of the system of drawings, Figures 1 to 6, will be alternately referred to in the description, either as apparatus and circuits at the outward or at the inward terminal.

Operation of the squelch relay 15 at the inward terminal connects ground to the signal conductor 16, over contact 17 of the detector relay TDR and conductor 18 to battery through relay RCV which operates thereby causing operation of relay ID-1 which can be traced from ground, contacts 19 of relay RCV, contacts 20 of relay OD and relay ID-1 to battery. Operation of relay ID-1 closes its contact 21 and 22 to connect the tip and ring conductor 23, 24 to the incoming selector in a loop circuit, including the upper winding of polarized supervisory relay SY in a circuit which can be traced from the tip conductor 23, contact 21 of relay ID-1, upper left primary winding of repeating coil 5, contacts 25 of relay ID-1, upper winding of polarized relay SY, rectifier element 26, contacts 27 of relay ID-1, lower left primary winding of repeating coil 5, contacts 28 of relay RCV now operated, contacts 22 of relay ID-1 and conductor 24 to the ring conductor of the incoming selector switch.

Due to the polarity of the rectifier element 26 in this circuit the incoming line switch operates in the well known manner. The operation of relay ID-1 and the consequent operation of SY, on the assumption that the incoming switch is idle, completes at contacts 29 of ID-1, a circuit to operate relay ID-2 which is traced from ground, contacts 29 of ID-1, contacts 30 of relay SY and winding of ID-2. Closure of contacts 29 of relay ID-1 also completes a holding circuit for itself and in cooperation with the closed contacts 31 of relay ID-2, a holding circuit is completed for ID-2.

Operation of relay SY closes its contacts 32, thereby connecting the common audio frequency signal or tone source 33 (3400 cycles) supplied over conductors 34 and 35 and contacts 36 of relay ID-2, to conductor P connected to the midpoint of the tip winding of the signalling or tone hybrid coil 37 of channel 1.

Operation of ID-2, also closes its contacts 38 thereby connecting battery over conductor 39 to the transmitter start lead TS extending to the start relay 13 of the radio transmitter at the inward terminal to cause it to transmit its carrier which is of a sufficiently different frequency from the carrier sent out from the outward transmitter to prevent interaction between transmission in opposite directions.

When the inward terminal transmitter is energized its carrier is modulated by the audio frequency tone connected to the tone hybrid 37 by operation of relay SY. This modulated radio carrier is received by the antenna of the radio receiver at the calling or outward terminal and operates the squelch relay 15 thereat. At this time the carrier received includes a modulation component of the audio or signal frequency (3,400 cycles) and hence this frequency passes the low pass filter 40, designed to pass all frequencies below 3,500 cycles but to block all higher frequencies. The signal frequency therefore passes through filter 40, is amplified by the receive amplifier 41 and passes through the band pass filter 42, designed and constructed to pass a narrow band of frequencies above those of audible voice (about 3,200 cycles) up to and including the audio signal frequency of 3,400 cycles, to the signal or tone detector 43 where it is translated into direct current and operates relays TDR. Operation of this relay opens its contact 17 thereby preventing operation of the RCV relay from the ground on the conductor 16 supplied by operation of the squelch relay 15.

The above mentioned radio carrier is also modulated with the conventional audible dial tone which after being amplified by the amplifier 41, is conducted over a branch circuit including conductors 44, 45, through low pass filter 46 to voice hybrid coil 47 from which point it is transmitted through the repeating coil 5 to the calling subscriber as an indication that the switch at the inward terminal has been seized and conditioned for the reception of dial pulses.

Actuation of the dial and its release at the calling station alternately releases and operates relay C at the outward terminal in accordance with the interruptions of the dial contacts.

Release of relay C closes its contacts 51 thereby operating relay CHO in a circuit which includes contacts 52 of relay OD. Relay CHO in operating closes its contacts 53, 54, thereby shunting the upper and lower primary windings of repeat coil 5, and at contacts 55, short circuits the upper or tertiary winding of the tone hybrid coil 37 and the tertiary winding of the voice hybrid coil 47, thus preventing any possible local distortion of the dial pulses due to the impedance of the coil and also attenuates any audible dial clicks. Short circuiting the hybrid tertiary windings prevents feed back in the form of singing which may be caused by the unbalance of the hybrid network due to shorting of the repeat coil 5.

Release of relay C also closes its contacts 8 thereby connecting the source of audio frequency tone current 33 (Fig. 5) over conductors 34, 35, contact 48 of relay ID–2 and contact 8 of relay C to the P lead extending to the tone hybrid coil 37 and thence over the tip and ring conductors through the low pass filter 49 and the line amplifier 50 to the input of the radio transmitter where it modulates the carrier frequency initially transmitted when the call was initiated. Therefore the transmitted radio carrier is intermittently modulated by the signalling tone frequency in accordance with the interruptions of the dial, represented by the alternate release and operations of relay C, and received at the inward terminal by the radio receiver, passed through the low pass filter 40, the receive amplifier 41 and band pass filter 42, to the tone detector 43, where it is translated to direct current to intermittently operate the TDR relay thereby causing the respective RCV relay to correspondingly release and operate.

At this time relays RCV, ID–1, SY, and ID–2, at the inward terminal, are operated.

On the first release of relay RCV, due to disconnection of the squelch relay ground at contacts 17 of relay TDR, relay CHO operates in a circuit traced from ground contacts 57 of relay RCV, contacts 58 of relay ID–2 and winding of slow to release relay CHO to battery. CHO in operating, performs the same function as the corresponding relay at the outward terminal just described, i. e., shortcircuits the primary winding of the repeating coil and the tertiary windings of the tone and voice hybrid coil. Each release of relay RCV also holds relay SY over its lower winding, contacts 59 of relay OD and contacts 58 of relay ID–2.

The intermittent release and operation of relay RCV also opens and closes its contacts 28 thus opening the circuit including tip and ring conductors 23, 24, to the incoming selector, whereupon the switch advances in accordance with the digit impulses transmitted from the calling station.

If a busy condition is encountered, at either an intermediate trunk or the called station line, the tip and ring conductors 23, 24 to the incoming selector are interrupted at either a 120 or 60 I. P. M. rate, in accordance with standard practice, and relay SY releases and operates at this rate as soon as relay RCV steadily operates following a train of impulses which opens the lower holding winding of relay SY. Release and operation of polarized relay SY alternately opens and closes at its contacts 32 the connection of audio tone frequency supplied over conductor 35 and contacts 36 of relay ID–2, whereupon the modulation of the radio carrier sent out from the transmitter at the inward terminal is intermittently interrupted which releases and operates the TDR relay at the outer terminal which operates and releases the RCV relay which correspondingly operates the reversing relay RV over contacts 60 of relay OD.

Operation and release of RV alternately reverses the battery supply back to the calling switch and together with the conventional audible busy tone indicates to the calling station, in a well known manner, that a busy condition at the called terminal has been encountered.

If the called line at the inward terminal has been found idle and connection made thereto ringing is initiated and when the station answers the battery and ground over conductors 23, 24 is reversed, as is well understood and polarized relay SY releases thereby opening its contacts 32 and disconnecting the modulating tone frequency from the transmitted radio carrier of that terminal.

At the outward terminal removal of the received modulated tone releases the respective TDR relay and re-operates relay RCV which steadily operates the reverse relay RV to reverse the tip and ring conductors 23, 24 to the incoming selector switch whereupon "cut through" occurs and the circuit is prepared for conversation.

When the called subscriber hangs up, the battery is again reversed over the tip and ring conductor 23, 24 thus operating the SY relay, in its conducting direction, thus closing contacts 32 and again connecting the modulating tone frequency to the P lead and thence to the tone hybrid and the radio transmitter. The modulated frequency is received at the outward terminal a portion of which passes through the filter 46, the voice hybrid 47 and repeat coil 5 to tip and ring conductors 1 and 2 and to the calling station as an indication that the called station has disconnected.

If the called subscriber flashes his switch hook as a recall the modulating frequency is intermittently connected and disconnected to and from relay SY to alternately transmit the modulating frequency back to the calling or outward terminal where it indicates by an intermittent tone that the called subscriber is flashing his switch hook. This however is obviously only important in case an operator is involved in the connection at the outward terminal. Upon disconnection at both terminals the respective radio transmitters are turned off and all circuits restore to normal.

The organization of the succeeding channels 2, 3 etc. shown in Figures 4, 5 and 6, and their operation, are identical with those of channel 1 just described except for this difference, that whereas channel 1 speech and the audio signal frequency are transmitted directly, without the aid of an intermediate carrier, between the hybrid coils of the channel and the radio link, channels 2, 3, etc. comprise means for introducing an intermediate frequency carrier of predetermined characteristic frequency at each terminal with means for modulating the outgoing transmission and demodulating the incoming transmission between the radio terminals and the exchanges, which is well known in principle to those familiar with carrier telephony.

Referring to Figures 4, 5 and 6, outward transmission from the hybrid coils of channel 2, for example, either voice or tone frequency, is passed through modulator $M_2$, (Fig. 6) supplied with a pre-determined intermediate carrier frequency (7,600 cycles for example), supplied by an oscillator $O_2$, whereby the lower side band frequency product of the modulated carrier is transmitted, to the exclusion of the carrier and the upper side band, to the separation filter $49_2$ and thence through the line amplifier 50 to the transmitter where it modulates the radio carrier.

Demodulation at the distant terminal is effected by demodulator $DM_2$ and passed through the low pass filter $61_2$ and receiving amplifier $41_2$ the output of which is separated by low pass filter $46_2$ to transmit voice frequencies to the channel 2 hybrid coils and the audio frequency tone, which is outside the voice range, to the tone detector circuit $43_2$ to control a relay corresponding to relay TDR shown in Figure 2. Operation of channel 3 is the same as channel 2 it being obvious that modulator $M_3$, demodulator $DM_3$, oscillator $O_3$, and filters 49₃ and 40₃ are constructed and arranged to operate in a higher group of frequencies, for example, between 8,400 and 11,800 cycles.

What I claim is:

1. In an automatic telephone system, first and second exchanges, a carrier medium connecting said exchanges, station lines terminating at each exchange, automatic switches at each exchange for selectively interconnecting said station lines and said carrier medium, a source of audio signal frequency outside the voice range at each terminal of the carrier medium, means at a first terminal of said medium responsive to switch seizure thereof for causing a first high frequency radio wave to be transmitted over said medium, means at the distant or second terminal of said carrier medium responsive to reception of said first high frequency radio wave for conditioning the switch at the second exchange for reception of dial pulses and for transmitting back over said medium a second high frequency radio wave modulated by the corresponding audio frequency source and a conventional audible frequency initiated by conditioning of said switch, and means at the first terminal responsive to reception of the audible component of said modulated wave to indicate, over the originating switch, the readiness of the distant switch to receive dial pulses.

2. A system in accordance with claim 1, characterized by means at the first carrier medium terminal responsive to dial pulses transmitted over a station line to said terminal to superpose said corresponding audio frequency source on the high frequency wave transmitted therefrom, in accordance with said pulse interruptions, as modulation of said transmitted radio wave, and means at the distant or second terminal responsive to reception of said pulse modulated high frequency wave to control advance of said conditioned switch at the second exchange.

3. A system in accordance with claim 1, characterized by means at the first carrier medium terminal responsive to dial interruptions to superpose said audio frequency source on the high frequency wave transmitted therefrom in accordance with said impulse interruptions, means at the distant or second terminal responsive to reception of said modulated wave to advance the conditioned switch thereat, means responsive to an answer by the called subscriber to remove the modulating frequency from the radio wave transmitted from the second to the first terminal, means at the first terminal responsive to cessation of modulation of the received radio wave to condition the switch thereat for conversation over the medium, means responsive to disconnection by the called subscriber for re-establishing modulation of said radio wave transmitted from the second terminal, and means at the first terminal responsive to reception of the radio wave modulated at the second terminal to indicate said disconnection.

4. In an automatic telephone system, first and second exchanges, telephone stations connected to each exchange, a line between said exchanges, an automatic switch at each exchange terminating said line, said switches being adapted to selectively connect one of said stations and the line, said line including an intermediate two-way radio link comprising a radio transmitter and receiver at a first end of the link and a corresponding receiver and transmitter at a second end, a source of carrier frequency for each transmitter, means responsive to a switch seizure of the line at the first exchange to connect the respective carrier source to the first transmitter, means at the second exchange responsive to reception of the carrier transmitted from the first transmitter to condition the automatic switch at the second exchange for operation, a source of audio frequency outside the voice range at each exchange, means at the second exchange responsive to conditioning of said second exchange switch to connect the carrier frequency source thereat to the respective transmitter and to superpose thereon said corresponding audio frequency and a conventional audible frequency initiated by conditioning of said switch, means at the first exchange responsive to reception of the audible frequency component of the modulated carrier transmitted from the second transmitter to produce a signal indicating the conditioning of the called or second switch, impulse producing means at the stations, means at the first exchange responsive to impulse interruptions produced by a connected station for intermittently connecting the respective audio frequency source in superposition on said carrier frequency wave outgoing from the respective transmitter, means at the second exchange responsive to the intermittent modulation of the received carrier wave to control the advance of the automatic switch thereat, means responsive to an intermittent open and closed circuit condition encountered when the automatic switch stops on a busy called line to alternately interrupt the audio frequency modulation of the carrier wave transmitted back to the first radio receiver, means at the first exchange responsive to reception of this interrupted modulation for indicating a busy condition of the called station line, means at the second exchange responsive to an answer by the called station for removing the audio frequency modulation of the carrier transmitted back to the first exchange to cause response thereat of means to condition the first switch for through conversation.

5. In an automatic telephone system, first and second exchanges, telephone stations connected to each exchange, a line between said exchanges, an automatic switch at each exchange terminating said line, said switches being adapted to selectively connect one of said stations and the line, said line including an intermediate two-way radio link comprising a radio transmitter and receiver at a first end of the link and a corresponding receiver and transmitter at a second end, a source of carrier frequency for each transmitter, means responsive to a switch seizure of the line at the first exchange to connect the respective carrier source to the first transmitter, means at the second exchange responsive to reception of the carrier transmitted from the first transmitter to condition the automatic switch at the second exchange for operation, a source of audio frequency outside the voice range at each exchange, means at the second exchange responsive to conditioning of said second exchange switch to connect the carrier frequency source thereat to the respective transmitter and to superpose thereon said corresponding audio frequency and a conventional audible frequency initiated by conditioning of said switch, means at the first exchange responsive to reception of the audible frequency component of the modulated carrier transmitted from the second transmitter to produce a signal indicating the conditioning of the called or second switch, impulse producing means at the stations, means at the first exchange responsive to impulse interruptions produced by a connected station for intermittently connecting the respective audio frequency source in superposition on said carrier frequency wave outgoing from the respective transmitter, means at the second exchange responsive to the intermittent modulation of the received carrier wave to control the advance of the automatic switch thereat.

6. In an automatic telephone system, first and second exchanges, telephone stations connected to each exchange, a line between said exchanges, an automatic switch at each exchange terminating said line, said switches being adapted to selectively connect one of said stations and the line, said line including an intermediate two-way radio link comprising a radio transmitter and receiver at a first end of the link and a corresponding receiver and transmitter at a second end, a source of carrier frequency for each transmitter, means responsive to a switch seizure of the line at the first exchange to connect the respective carrier source to the first transmitter, means at the second exchange responsive to reception of the carrier transmitted from the first transmitter to condition the automatic switch at the second exchange for operation, a source of audio frequency outside the voice range at each exchange, means at the second exchange responsive to conditioning of said second exchange switch to connect the carrier frequency source thereat to the respective transmitter and to superpose thereon said corresponding audio frequency and a conventional audible frequency initiated by conditioning of said switch, means at the first exchange responsive to reception of the audible frequency component of the modulated carrier transmitted from the second transmitter to produce a signal indicating the conditioning of the called or second switch, impulse producing means at the stations, means at the first exchange responsive to impulse interruptions produced by a connected station for intermittently connecting the respective audio frequency source in superposition on said carrier frequency wave outgoing from the respective transmitter, means at the second exchange responsive to the intermittent modulation of the received carrier wave to control the advance of the automatic switch thereat, means at the second exchange responsive to an answer by the called station for removing the audio frequency modulation of the carrier transmitted back to the first exchange to cause response thereat of means to condition the first switch for through conversation.

JAMES R. STEWART.

REFERENCES CITED

The following references are of record in the file of this patent:

UNITED STATES PATENTS

| Number | Name | Date |
|---|---|---|
| 1,572,756 | Smythe | Feb. 9, 1926 |
| 1,688,454 | Demarest et al. | Oct. 23, 1928 |
| 2,061,699 | Fox | Nov. 24, 1936 |
| 2,064,958 | Taylor | Dec. 22, 1936 |
| 2,129,332 | Mastini | Sept. 6, 1938 |
| 2,137,023 | Monk | Nov. 15, 1938 |
| 2,176,868 | Boswau | Oct. 24, 1939 |
| 2,233,183 | Roder | Feb. 25, 1941 |
| 2,250,950 | Goldsmith | July 29, 1941 |
| 2,298,409 | Peterson | Oct. 13, 1942 |
| 2,326,290 | Dickieson | Aug. 10, 1943 |
| 2,424,577 | Mauge | July 29, 1947 |
| 2,457,434 | Bartelink | Dec. 28, 1948 |
| 2,469,555 | Hitchcock | May 10, 1949 |
| 2,475,657 | Peterson | July 12, 1949 |

FOREIGN PATENTS

| Number | Country | Date |
|---|---|---|
| 489,609 | Great Britain | Oct. 19, 1937 |